US008954769B2

(12) United States Patent
Yoshida

(10) Patent No.: US 8,954,769 B2
(45) Date of Patent: Feb. 10, 2015

(54) IMAGE PROCESSING APPARATUS RESTRICTING SHIFTING TO POWER SAVING MODE UNTIL THE APPARATUS SENDS A NOTIFICATION INDICATING THE LOCATION OF A NEWLY STORED DOCUMENT

(75) Inventor: Toru Yoshida, Tokyo (JP)

(73) Assignee: Canon Kabushiki Kaisha

( * ) Notice: Subject to any disclaimer, the term of this patent is extended or adjusted under 35 U.S.C. 154(b) by 494 days.

(21) Appl. No.: 13/233,995

(22) Filed: Sep. 15, 2011

(65) Prior Publication Data

US 2012/0072747 A1  Mar. 22, 2012

(30) Foreign Application Priority Data

Sep. 22, 2010 (JP) ................. 2010-211984

(51) Int. Cl.
*G06F 1/26* (2006.01)
*G06F 1/32* (2006.01)
*G06F 1/00* (2006.01)
*G03G 15/00* (2006.01)
*H04N 1/00* (2006.01)
*H04N 1/32* (2006.01)

(52) U.S. Cl.
CPC ............. *G06F 1/3209* (2013.01); *G06F 1/26* (2013.01); *G03G 15/5004* (2013.01); *G06F 1/3228* (2013.01); *G06F 1/3284* (2013.01); *H04N 1/00204* (2013.01); *H04N 1/00244* (2013.01); *H04N 1/00408* (2013.01); *H04N 1/00464* (2013.01); *H04N 1/00885* (2013.01); *H04N 1/00896* (2013.01); *H04N 1/00925* (2013.01); *H04N 1/32363* (2013.01); *G03G 15/502* (2013.01); *H04N 2201/0018* (2013.01); *H04N 2201/0039* (2013.01); *H04N 2201/0094* (2013.01); *Y02B 60/1267* (2013.01); *G03G 2215/00109* (2013.01)
USPC .......................................... 713/320; 713/300

(58) Field of Classification Search
CPC .......................................................... G06F 1/32
USPC ................................................................ 713/320
See application file for complete search history.

(56) References Cited

U.S. PATENT DOCUMENTS

| 5,813,017 | A | * | 9/1998 | Morris ................................. 1/1 |
| 5,983,357 | A | * | 11/1999 | Sun ............................... 713/324 |
| 8,296,826 | B1 | * | 10/2012 | Bartolucci et al. ............... 726/4 |
| 2003/0159074 | A1 | * | 8/2003 | Oar et al. ...................... 713/300 |
| 2004/0090597 | A1 | * | 5/2004 | De Haan ........................ 352/43 |
| 2006/0007481 | A1 | * | 1/2006 | Kato et al. .................. 358/1.15 |

(Continued)

FOREIGN PATENT DOCUMENTS

| EP | 1067753 A2 | 1/2001 |
| EP | 2037348 A2 | 3/2009 |

(Continued)

*Primary Examiner* — Thomas Lee
*Assistant Examiner* — Robert Cassity
(74) *Attorney, Agent, or Firm* — Canon U.S.A., Inc. IP Division

(57) ABSTRACT

An image processing apparatus capable of shifting to a power saving mode. The image processing apparatus includes a storing unit configured to store a document in a storage device, a notification unit configured to periodically notify an apparatus of a predetermined destination of information about a document that has been newly stored by the storing unit into the storage device, and a control unit configured to restrict shifting to a power saving mode in which the notification unit cannot make the notification after storage of a document by the storing unit has been completed and until the notification unit notifies at least information about the document.

8 Claims, 9 Drawing Sheets

(56) References Cited

U.S. PATENT DOCUMENTS

| | | |
|---|---|---|
| 2006/0010332 A1* | 1/2006 | Nakamura et al. ............ 713/323 |
| 2006/0031692 A1 | 2/2006 | Kato et al. |
| 2007/0050769 A1* | 3/2007 | Switzer et al. ................ 718/100 |
| 2010/0231966 A1 | 9/2010 | Todaka |
| 2011/0004776 A1* | 1/2011 | Tanaka ......................... 713/323 |

FOREIGN PATENT DOCUMENTS

| | | | |
|---|---|---|---|
| JP | 4068964 A | | 3/1992 |
| JP | H07-212395 A | | 8/1995 |
| JP | 2001-075688 A | | 3/2001 |
| JP | 2003-085178 A | | 3/2003 |
| JP | 2004-023133 A | | 1/2004 |
| JP | 2004-088493 A | | 3/2004 |
| JP | 2006-222569 A | | 8/2006 |
| JP | 2007-334304 A | | 12/2007 |
| JP | 2008-167330 A | | 7/2008 |
| JP | 2008-288979 A | | 11/2008 |
| JP | 2009-049722 A | | 3/2009 |
| JP | 2009-239743 A | | 10/2009 |

* cited by examiner

FIG. 7

```
NEW DOCUMENT HAS BEEN STORED IN AREA INDICATED
BELOW.
PLEASE CONFORM http://xxx/yyy/zzz/yamada.pdf
http://xxy/yyy/zzz/suzuki.pdf
```

IMAGE PROCESSING APPARATUS RESTRICTING SHIFTING TO POWER SAVING MODE UNTIL THE APPARATUS SENDS A NOTIFICATION INDICATING THE LOCATION OF A NEWLY STORED DOCUMENT

BACKGROUND OF THE INVENTION

1. Field of the Invention

The present invention relates to an image processing apparatus capable of shifting to a power saving mode, and to a control method for the image processing apparatus, and also to a program.

2. Description of the Related Art

Conventionally, an image processing apparatus, such as a multifunction peripheral, can be operated in a power saving mode by stopping supply of electric power for specific parts thereof to reduce power consumption. More specifically, if a user instructs the image processing apparatus to shift to a power saving mode or if the user has not performed any operation on the image processing apparatus for a certain period of time, this constitutes an event that causes the image processing apparatus to shift from a normal power mode to the power saving mode.

In an image processing apparatus configured as described above, even if an event occurs which causes a shift of the mode to the power saving mode while a prescribed process is in progress in the image processing apparatus, the image processing apparatus is prohibited from shifting from the normal power mode to the power saving mode.

Japanese Patent Application Laid-Open Number 2006-222569 discusses a case where the image processing apparatus is allowed to enter a power saving mode if an event occurs which causes a shift to a power saving mode when no job is being executed in the image processing apparatus.

Moreover, among the conventional image processing apparatuses, an image processing apparatus is well known, in which if a document obtained by scanning an original, for example, is stored in a memory area called a box (hereinafter referred to as a "document storage process"), and when a new document is stored in the box, notification is given to a predetermined destination that a document has been stored in the box (hereinafter referred to as a "document storage notice").

Issuing a document storage notice is a process in which, when a new document is stored in the box, information including a storage location and a title of the document is sent by e-mail to previously set destinations.

The document storage process is generally executed at irregular intervals. Sometimes this process is not executed for a long time, and other times a large amount of documents is stored in a short period of time. A document storage notice described above may not be sent immediately after the document storage process is finished, but may be sent at regular intervals. When a plurality of documents have been stored in the box within a specified time, document storage notices can be given collectively by sending the document storage notices at regular timing.

Generally, if a process is not being executed in the image processing apparatus, the image processing apparatus is allowed to shift to a power saving mode. In other words, in the image processing apparatus which can perform a document storage process and issue a document storage notice, it is possible to shift to a power saving mode after a process to store a document has been completed and before a document storage notice begins to be issued.

However, if a shift to a power saving mode is executed after a document storage process has been completed and before a document storage notice begins to be issued, a problem arises as follows. Specifically, if a shift to a power saving mode takes place, power is not supplied to the parts required to issue a document storage notice. For this reason, a document storage notice, which should be normally issued after the document storage process is completed, cannot be issued due to the shift to the power saving mode.

The above-described problem can be solved when power supply is returned from a power saving mode to a normal power mode at timing when a document storage notice is issued. However, according to this method, power supply is returned from the power saving mode to the normal power mode each time a notice is issued even when a document storage process has not been performed. In other words, it is necessary to repeat a shift to and a return from the power saving mode many times. Therefore, effects of power consumption reduction by shifting to the power saving mode cannot be sufficiently obtained.

Moreover, there is another problem with an image processing apparatus which executes a document storage process at irregular intervals and also executes a process of issuing, at regular intervals, a notice that a document has been stored by the document storage process. More specifically, the problem is that a shift to the power saving mode cannot be performed in an appropriate manner.

SUMMARY OF THE INVENTION

The present invention is directed to providing a control unit to enable an image processing apparatus, which performs a document storage process and issues a document storage notice, to shift to a power saving mode in an appropriate manner.

According to an aspect of the present invention, an image processing apparatus includes a storing unit configured to store a document in a storage device, a notification unit configured to notify at predetermined timing a storage location of a document newly stored in the storage device by the storage device, a power supply unit configured to supply electric power to the notification unit in a normal power mode or in a power saving mode that supplies power at a reduced level lower than in the normal power mode, a control unit to restrict shifting from the normal power mode to the power saving mode after storage of a document by the storing unit has been completed until the notification unit notifies at least the storage location.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 illustrates an example of an e-mail sent to a computer according to the first exemplary embodiment.

DETAILED DESCRIPTION OF THE EMBODIMENTS

Various exemplary embodiments, features, and aspects of the invention will be described in detail below with reference to the drawings.

Figure 1:
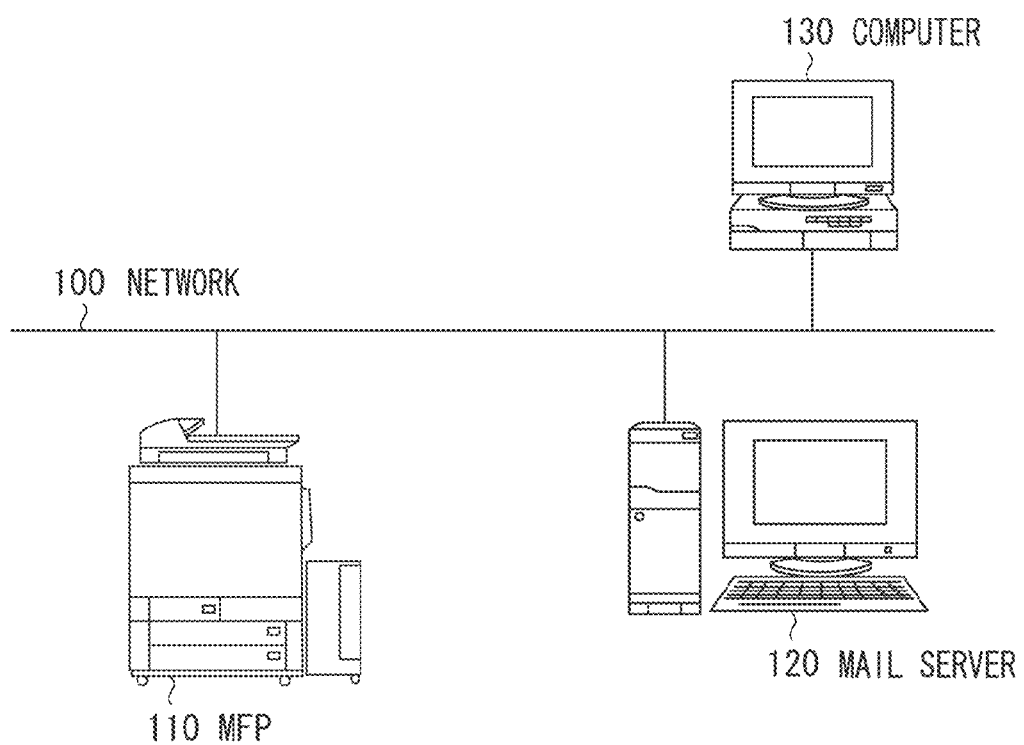
FIG. 1 is a block diagram illustrating a system configuration of an image processing system according to a first exemplary embodiment of the invention.

Referring to FIG. 1, a system configuration of an image processing system according to a first exemplary embodiment will be described.

An image processing system according to the first exemplary embodiment includes a multifunction peripheral (MFP) 110, a mail server 120, and a computer 130. Those units are connected to a network 100 and can communicate with one another.

The MFP 110 includes a plurality of functions such as a scan function, a facsimile function, an e-mail transmission function, and a web server function. The MFP 110 is an example of an image processing apparatus, and may be an apparatus, including any one of the above-mentioned functions.

In the present exemplary embodiment, the MFP 110 performs a document storage process and sends a document storage notice by using the above-mentioned functions. The document storage process is a process to receive document data sent from the scanner and document data sent through a network or a public line, and to store the document data in a specified storage area of a hard disk. A document storage notice is a process to send an e-mail to a predetermined destination stating that a document has been stored by a document storage process.

The detailed configuration of the MFP 110 will be described below. Though only one MFP 110 is illustrated in FIG. 1, a plurality of MFPs may be connected to the network 100.

The mail server 120 serves as an SMTP sever and a POP3 server, and can receive from the network 100 data sent by the MFP 110 and can transmit the received data. The computer 130 receives and sends e-mails by using the mail server 120. The computer 130, by using a web browser mounted therein, can access the MFP 110 from outside via the network 100.

Figure 2:
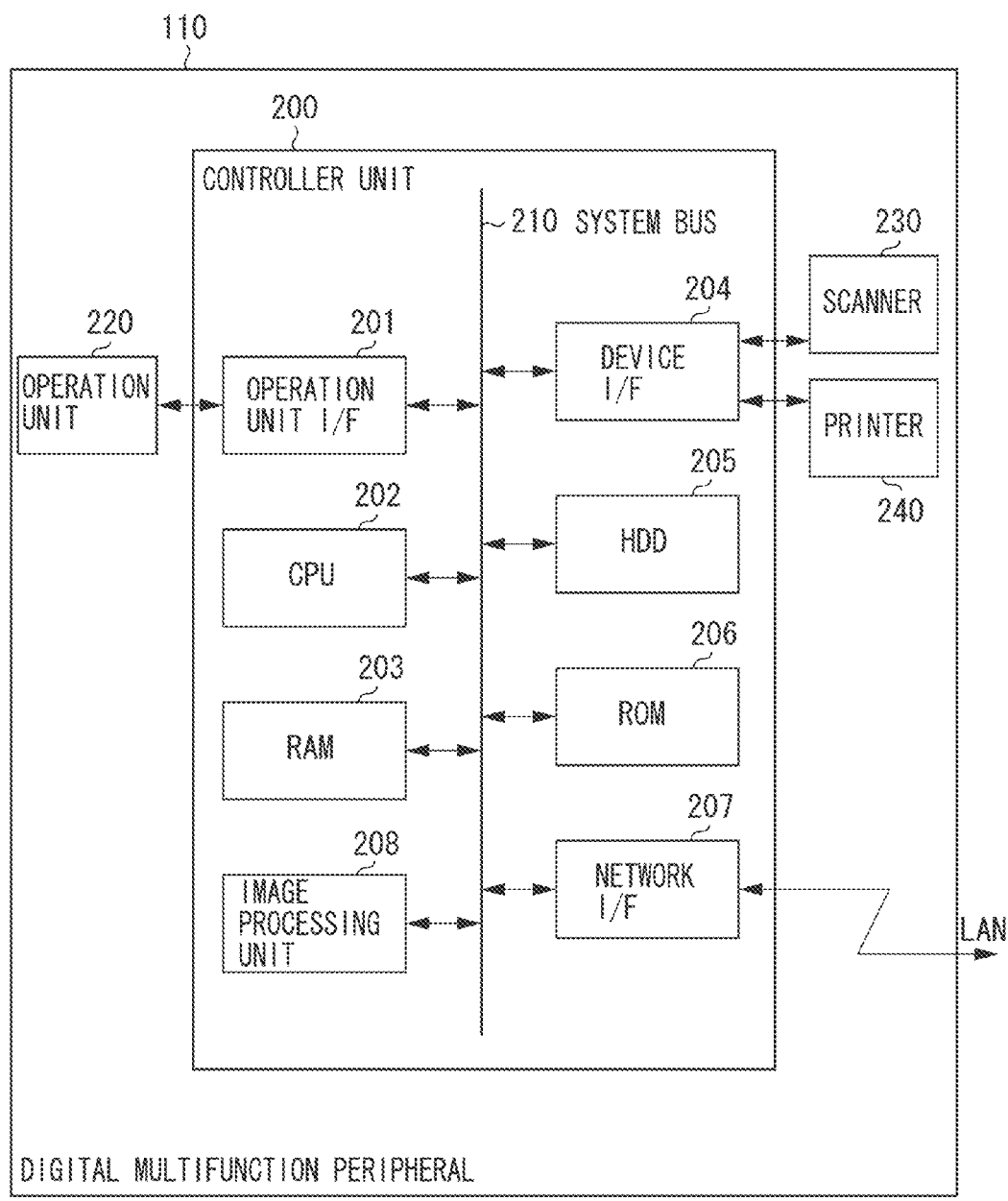
FIG. 2 is a block diagram illustrating a hardware configuration of a multifunction peripheral (MFP) according to the first exemplary invention.

Referring to FIG. 2, a hardware configuration of the MFP 110 in FIG. 1 will be described. The MFP 110 includes a controller unit 200, an operation unit 220, operation unit 220, a scanner 230, and a printer 240. The controller unit 200 is connected to the operation unit 220, a scanner 230, and the printer 240.

The controller unit 200 controls the MFP 110. The controller unit 200 includes an operation unit I/F 201, a CPU 202, a RAM 203, a device I/F 204, a HDD 205, a ROM 206, a network I/F 207, and an image processing unit 208. The units included in the controller unit 200 are interconnected via a system bus 210.

The operation unit I/F 201 is connected to the operation unit 220. The operation unit 220 is an integral unit combining a display device, such as a touch panel to notify the status of the MFP 110 and operation buttons to give instructions to the MFP 110.

The CPU 202 is an arithmetic unit to control the entire MFP 110. The RAM 203 is a system work memory to enable the CPU 202 to operate, and also serves as an image memory to temporarily store image data. Onto the RAM 203, programs, such as an operating system, system software, and application software are loaded.

The device I/F 204 connects the scanner 230 and the printer 240, which are image input/output devices, to the controller unit 200 to input and output image data. Image data input by the scanner 230 through the device I/F 204 is stored in the RAM 203 or the HDD 205.

Stored data is subjected to image processing, if required, by an application program stored in the RAM 203 or by the image processing unit 208. When image data is output, the image data is output to the printer 240 via the device I/F 204.

The HDD 205 is a hard disk drive, which stores an operating system, system software, application software, and image data. In the present exemplary embodiment, document data generated by the scanner 230 reading an original is stored in the HDD 205

The ROM 206 stores a boot program of the system. The ROM 206 also stores system programs and application programs.

The network I/F 207 is connected to a LAN and serves to input and output image data or information to control the MFP 110.

The image processing unit 208 performs image processing, image rotation, image encoding, resolution conversion, color space conversion, and gradation conversion on data input from the scanner 230 and data to be output to the printer 240.

Though not illustrated in FIG. 2, the MFP 110 includes a fax function, and is able to perform fax transmission by connecting a modem between the controller unit 200 and a public line via an interface for modem.

Figure 3:
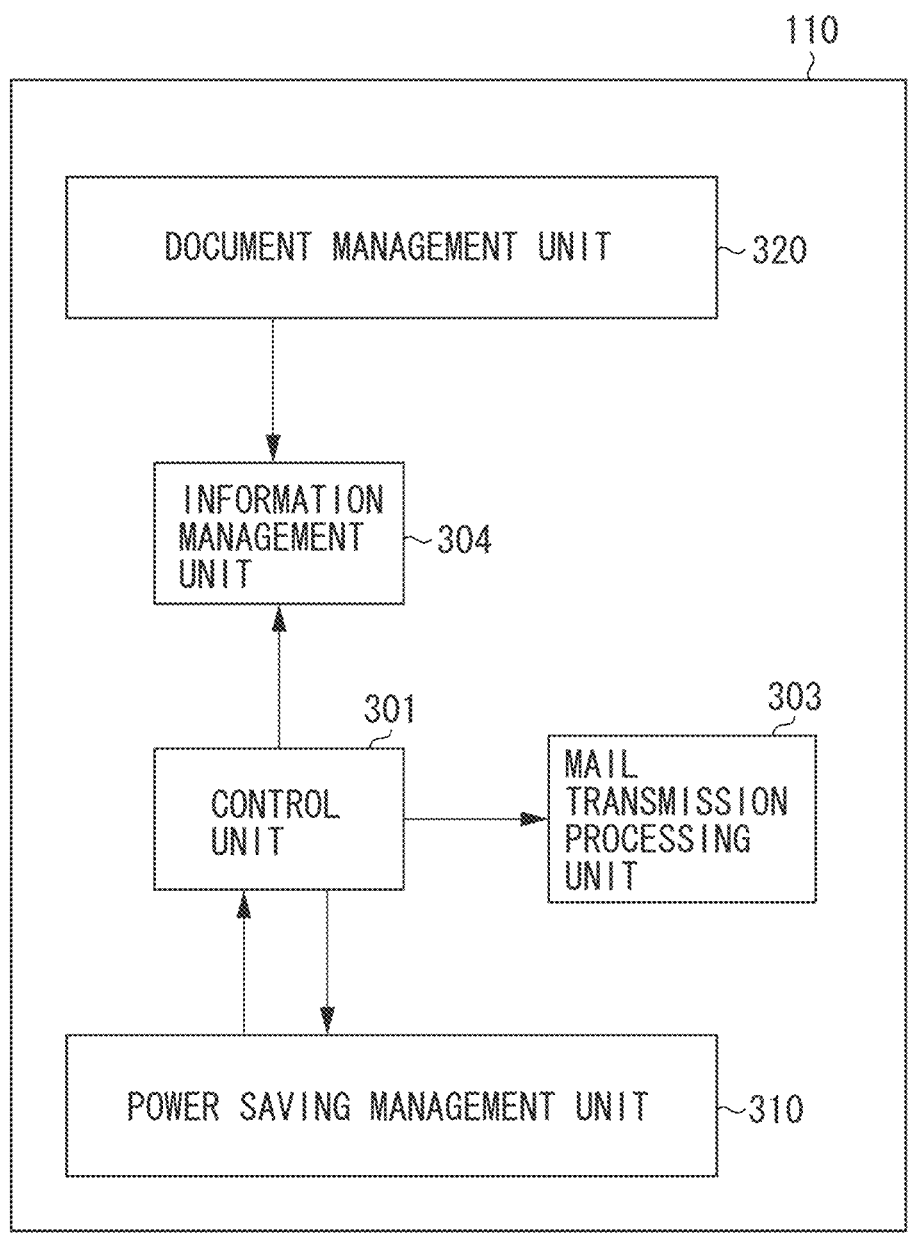
FIG. 3 is a block diagram illustrating a software configuration of the MFP according to the first exemplary embodiment.

Referring to FIG. 3, a software configuration of the MFP 110 according to the first exemplary embodiment will be described.

The MFP 110 includes a document management unit 320, an information management unit 304, a control unit 301, a mail transmission processing unit 303, and a power saving management unit 310. Those units are programs which are stored in the HDD 205 or the ROM 206, and the programs will be loaded to the RAM 203 to be executed by the CPU 202.

The document management unit 320 stores document data generated by reading an original by the scanner 230 and document data received externally via a network or a public circuit in the HDD 205. The document management unit 320 also manages the stored document data. Moreover, the document management unit 320 stores storage information of document data in addition to the document data. In the present exemplary embodiment, the storage information of the document data refers to information including a document name, a storage location (folder name) of document data, a creator of a document, and time and date of creation.

The power saving management unit 310 controls the MFP 110 whether to permit or prohibit shifting the MFP to a power saving mode from a standby state (normal power mode).

In the present exemplary embodiment, normal power mode refers to a state where power is supplied to all parts illustrated in the hardware configuration in FIG. 2. The power saving mode refers to a state where power supplied to specific parts of the computer is reduced to a level lower than a normal level (or to zero).

The power saving mode is classified into level 1 and level 2. At level 1, power supply to the operation unit 220, the scanner 230, and the printer 240 is stopped or reduced to a lower level than that in a normal operation. However, the other component units are supplied with normal-level power.

At level 2, power is supplied only to the RAM 203, the network I/F 207, the operation unit I/F 201 (and a portion of the operation unit 220), but power supply to the other units is stopped. In other words, power is not supplied to the scanner 230, the printer 240, the CPU 202, the device I/F 204, and the HDD 205, so that power consumption in a power saving mode is reduced to about 1 watt to a few watts.

When the MFP 110 is operating at level 2 of power saving mode, the MFP 110 cannot issue a document storage notice. In other words, it is possible to issue a document storage notice only when the MFP 110 is operating in the normal power mode or at level 1 of the power saving mode. On the other hand, regarding to a document storage process, even when the MFP 110 is operating at level 2 of the power saving mode, in response to the user's operation on the operation unit 220, power is supplied to the other units of the MFP, a document storage process can be executed.

The information management unit 304, when detecting that a new document has been stored in the document management unit 320, obtains detected new document storage information (such as a document name, a storage location (folder name) of document data, a creator of a document, and time and date of creation) from the document management unit 320, and stores the storage information in the HDD 205.

The control unit 301 periodically confirms whether or not the storage information of the new document is managed by the information management unit 304. In the present exemplary embodiment, the confirmation is carried out at intervals of 30 seconds. If it is confirmed that the storage information of document data, which has been newly stored document data since the last confirmation, is being managed by the information management unit 304, the control unit 301 obtains storage information of the document data from the information management unit 304, and instructs the mail transmission processing unit 303 to transmit e-mail.

Figure 4:
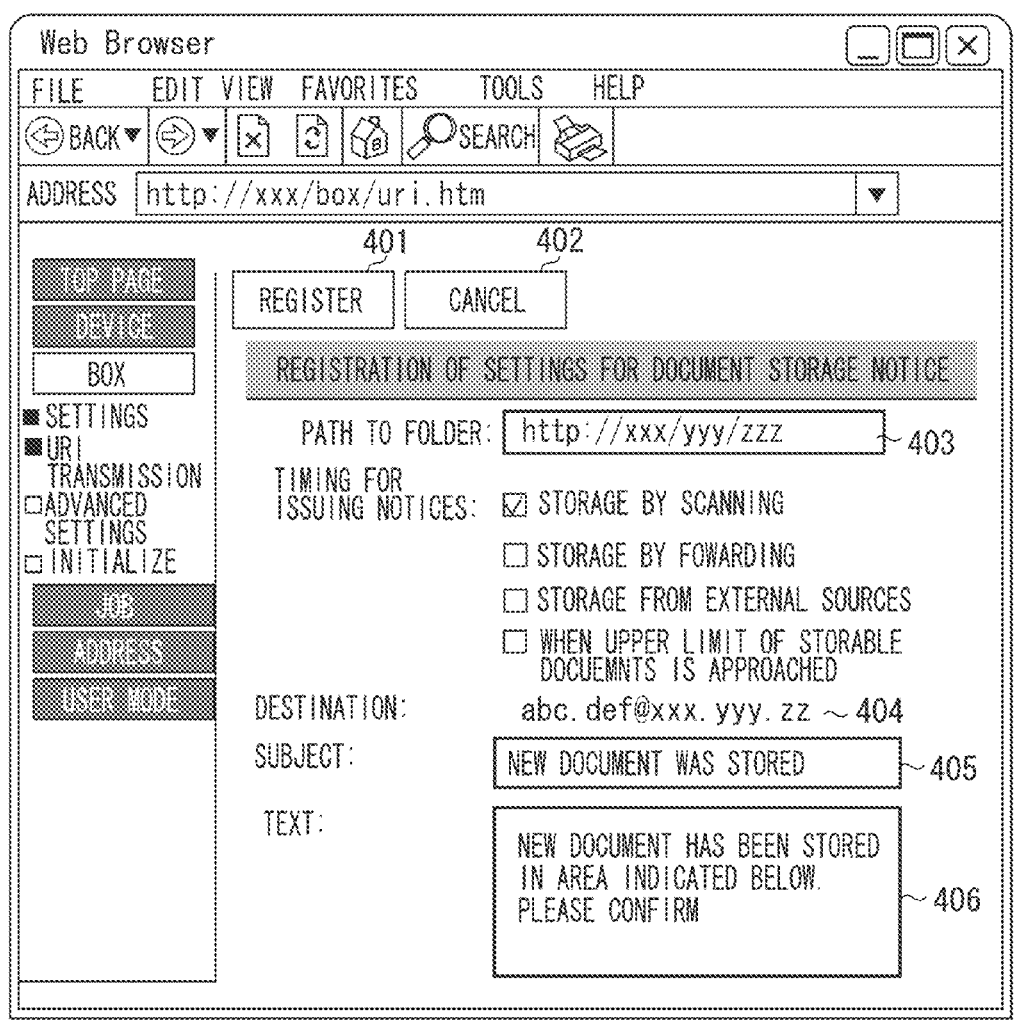
FIG. 4 is an example of a screen displayed on an operation unit of the MFP according to the first exemplary embodiment.

FIG. 4 is an example of a registration screen of a document storage notice. The registration screen is displayed by accessing a web browser of the MFP 110 via a network from a web browser of the computer 130. Settings for document storage notice may be performed on the operation unit 220 of the MFP 110.

Setting items on the registration screen in FIG. 4 include a folder path 403 to identify a folder used when a document storage notice is issued, a notice destination 404 to which an e-main is sent, a subject 405 of the e-mail, and a text 406 of the e-mail. In addition, a register button 401 used to register input values of the setting items, and a cancel button 402 used to cancel input values for the setting items are provided.

In the example of the registration screen in FIG. 4, when document data generated by reading by the scanner 230 is stored in a folder indicated by "http://xxx/yyy/zzz" on the MFP 110, e-mail is sent to "abcdef@xxx.yyy.zzz". When the register button 401 is pressed in a state where the folder path 403 to the text 406 are input, the document management unit 320 stores values input in the folder path 403 to the text 406 in the HDD 205 and manages them.

In the present exemplary embodiment, the HDD 205 of the MFP 110 is shared by many devices on the network by using web DAV and SMB protocols and can be accessed from other devices on the network.

Figure 5:
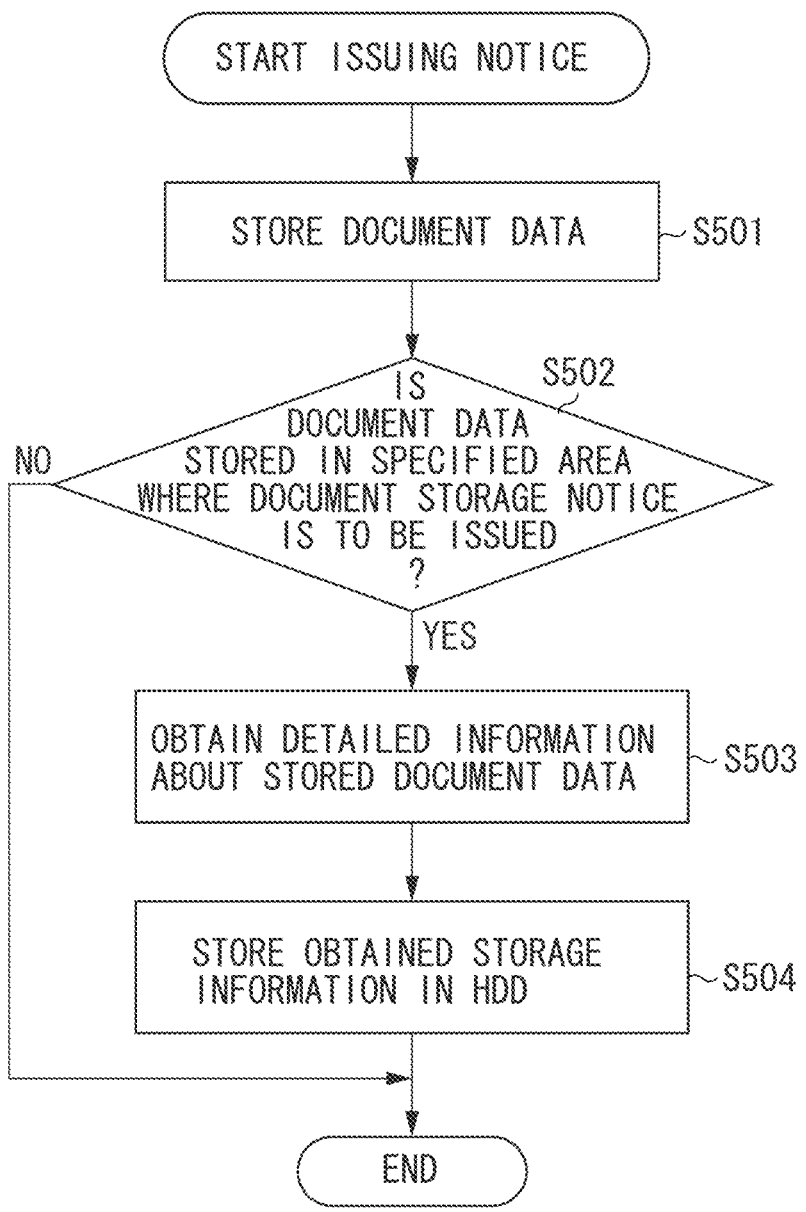
FIG. 5 is a flowchart illustrating a document storage process in the MFP according to the first exemplary embodiment.

Referring to FIG. 5, a document storage process in the MFP 110 according to the first exemplary embodiment will be described. A program that realizes the steps of the flowchart in FIG. 5 is stored in the HDD 205 or the ROM 206 of the MFP 110. The program is loaded to the RAM 203, and is executed by the CPU 202.

The steps of the flowchart in FIG. 5 begin to be executed when the user operates the operation unit 220 of the MFP 110 and gives an instruction to read an original.

In step S501, the document management unit 320, when receiving an instruction to read an original, stores document data input from the scanner 230 in the HDD 205. After document data is stored, the document management unit 320 gives the information management unit 304 a notice that a new document has been stored in the HDD 205.

In step S502, when receiving a notice from the document management unit 320, the information management unit 304 determines whether the value of a storage location of document data stored in the HDD 205 coincides with a value of a folder path 403 registered through the registration screen in FIG. 4.

If the value of the storage location of stored document data coincides with the value of the folder path (YES in step S502), the process proceeds to step S503. On the other hand, if the two values are not the same (NO in step S502), the process of this flowchart is finished.

In step S503, the information management unit 304 obtains storage information (the document name, the creator of the document, the time and date of creation, etc.) of the document data stored in step S501 from the document management unit 320. In step S504, the information management unit 304 stores the storage information of obtained document data in the HDD 205.

Figure 6:
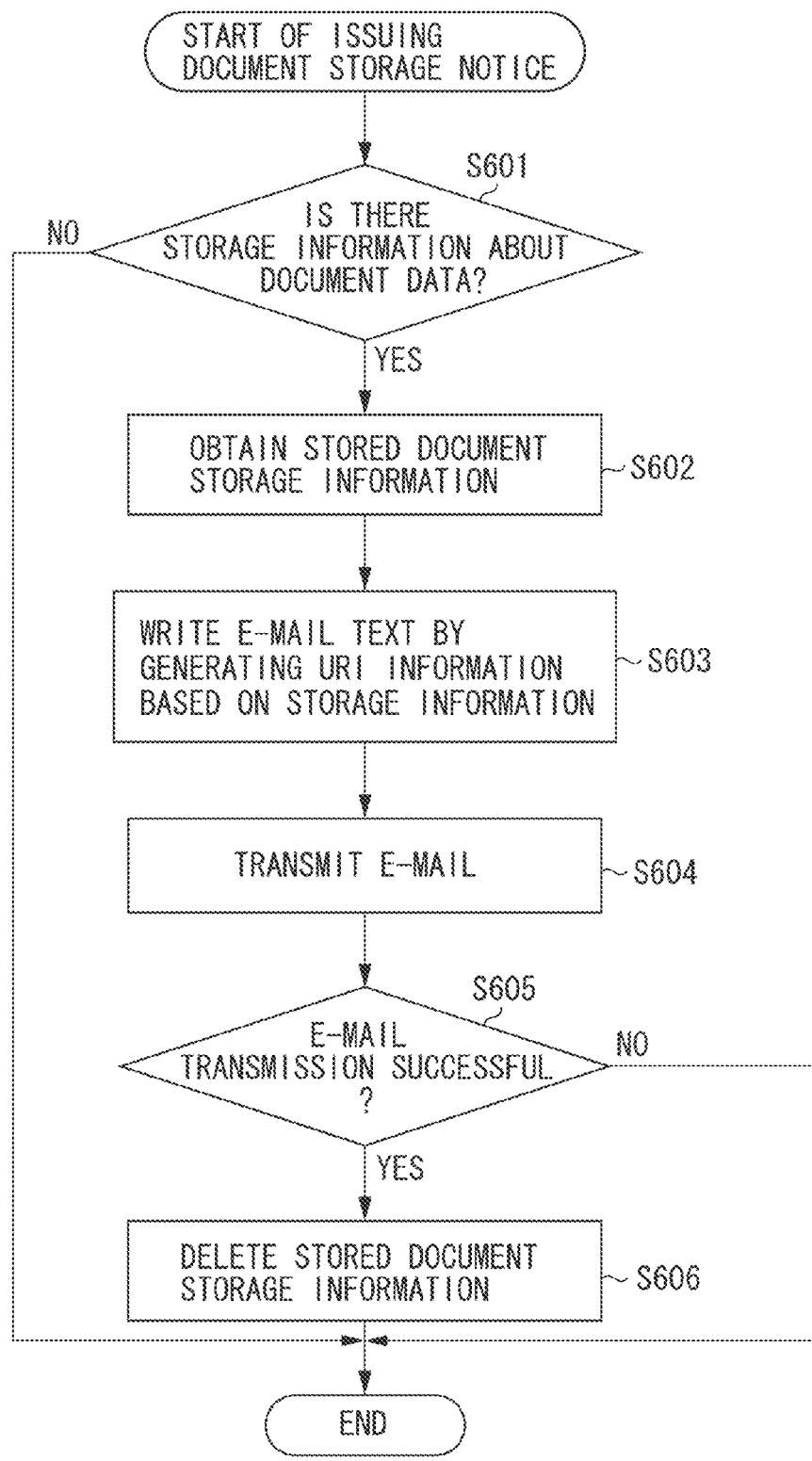
FIG. 6 is a flowchart illustrating a document storage process in the MFP according to the first exemplary embodiment.

Referring to FIG. 6, a document storage notice in the MFP 110 according to the first exemplary embodiment will next be described. Programs to execute steps of a flowchart in FIG. 6 are stored in the HDD 205 or the ROM 206 of the MFP 110. The programs are loaded to the RAM 203 and executed by the CPU 202.

Each processing illustrated in the flowchart in FIG. 6 is executed at fixed intervals without being operated by the user. In other words, after power supply to the MFP 110 is turned on, each processing is executed regularly. When the MFP 110 is operating at level 2 of the power saving mode, the process in FIG. 6 is not executed by returning from level 2 of the power saving mode to the normal power mode. In other words, the operations in the flowchart in FIG. 6 are performed only when the MFP 110 is operating in the normal power mode or at level 1 of the power saving mode.

In the present exemplary embodiment, the process of the flowchart of FIG. 6 is performed at intervals of 30 seconds. However, this process may be performed at longer intervals of 5 or 10 minutes. The longer the intervals are, the longer the period of time becomes after the document storage process is completed until a document storage notice is issued. The real-time processing cannot be achieved.

However, as the intervals become longer, a smaller number of times of the processing in FIG. 6 is required, and power consumption is more likely to be reduced. It is more probable that the document storage notification for a plurality of document storage process is performed at a time.

In step S601, the control unit 301 confirms whether there is storage information of document data managed by the information management unit 304. If there is storage information of document data (YES in step S601), the process proceeds to step S602. If there is not storage information of document data (NO in step S601), the process of this flowchart is finished.

In step S602, the control unit 301 issues a request to obtain storage information of document data from the information management unit 304. When receiving this request, the information management unit 304 reads storage information of document data from the HDD 205, and sends the storage information back to the control unit 301.

In step S603, the control unit 301 generates URI information to be written in the text of the e-mail according to the obtained storage information, and passes generated URI information and document data storage information to the mail transmission processing unit 303.

In step S604, the control unit 301 creates an e-mail based on the URI information and document data storage information received from the mail transmission processing unit 303, and transmits the e-mail via the network I/F 207. In other words, the control unit 301 transmits the e-mail to the notice destination 404 by using the subject 405 and the text 406 on the registration screen in FIG. 4.

In step S605, the mail transmission processing unit 303 determines whether the e-mail transmission process in step S604 is successful or not. If the transmission is successful (YES in step S605), the process proceeds to step S606.

In step S606, the control unit 301 receives from the mail transmission processing unit 303 notification that transmission of the e-mail is successful. The control unit 301 gives the information management unit 304 a request to delete the storage information obtained in step S502. The information management unit 304 deletes the storage information, the deletion of which has been requested, from the HDD 205.

On the other hand, if it is determined that the e-mail transmission is unsuccessful (NO in step S605), the storage information managed by the information management unit 304 is not deleted, and the process of the flowchart is finished.

In some cases, there may be a plurality of storage information of document data obtained in step S602. In such a case, the control unit 301 determines whether it is possible to send an e-mails collectively (determine whether the notice destinations 404 are the same in value), and in step S603, the control unit 301 writes a plurality of items of URI information in the text of an e-mail, and sends the e-mail in step S604.

Referring to an example illustrated in FIG. 7, the e-mail sent by the mail transmission processing unit 303 in step S604 will be described. FIG. 7 illustrates a text of an e-mail to be sent if document data which has been read by the scanner 230 is stored in the folder bus 403 that is registered in the registration screen in FIG. 4.

As is evident from FIG. 7, the URI information generated in step S603 has been added to the text 406. Therefore, a user who reads this e-mail instantly recognizes (in 30 seconds at the latest) that a new document has been stored in the box. The user who gives an instruction to perform a document storage process may be different from the user who reads the e-mail.

Figure 8:
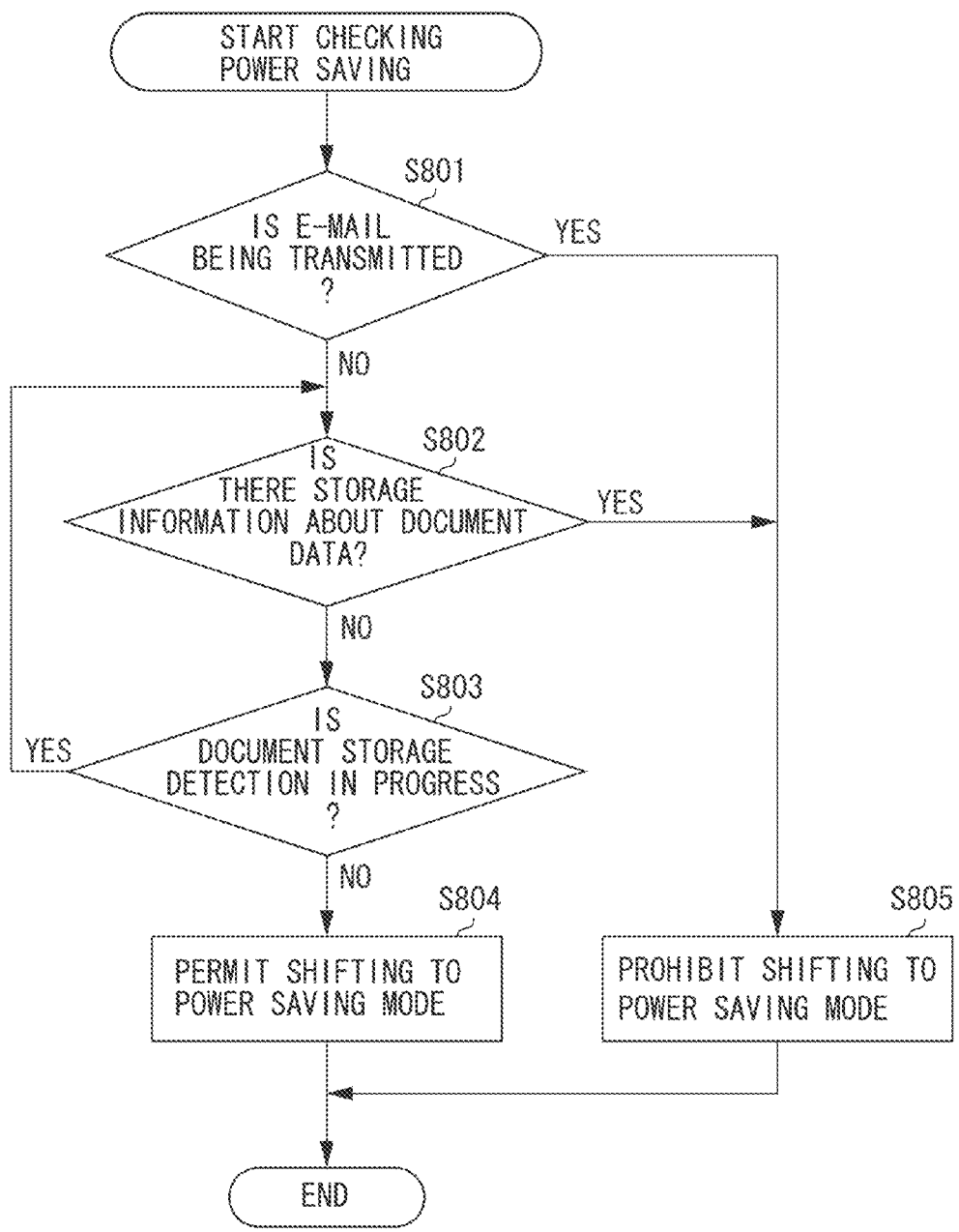
FIG. 8 is a flowchart illustrating a process when an event occurs which causes the image processing apparatus to shift to a power saving mode according to the first exemplary embodiment.

Referring to FIG. 8, in the MFP 110 according to the first exemplary embodiment, a process will be described which controls whether to permit or prohibit shifting from the normal power mode to the power saving mode. The programs for executing the steps in the flowchart in FIG. 8 are stored in the HDD 205 or the ROM 206 of the MFP 110. The programs are loaded to the RAM 203 and executed by the CPU 202.

The flowchart in FIG. 8 is started when an event occurs which causes power supply to shift to level 2 of the power saving mode when the MFP is in the normal power mode. The event that causes a shift to level 2 of the power saving mode may occur in response to a signal sent from the user at the operation unit 220. The event may be arranged to automatically occur when a job has not been executed in the MFP 110 for a predetermined length of time or when the MFP has not been operated for a predetermined length of time.

In step S801, the control unit 301 makes an inquiry to the information management unit 304 whether an e-mail transmission process is being executed via the network I/F 207. The control unit 301 also makes an inquiry whether any other process (a printing process or a user's operation, for example) being executed through the device I/F 204 or the operation unit I/F 201.

If it is determined based on the inquiry that an e-mail transmission process or some other process is being executed (YES in step S801), the process proceeds to step S805. On the other hand, if it is determined that an e-mail transmission process is not being executed and no other process is being performed (NO in step S801), the process proceeds to step S802.

In step S802, the control unit 301 makes an inquiry to the information management unit 304 whether there is storage information of newly stored document data. If it is determined based on the inquiry that there is storage information of newly stored document data (YES in step S802), the process proceeds to step S805. If it is determined that there is no storage information of newly stored document data (NO in step S802), the process proceeds to step S803.

In step S805, the control unit 301 sends a reply to the power saving management unit 310 stating that shifting from the normal power mode to level 2 of the power saving mode is prohibited, and finishes the processing. The power saving management unit 310 prohibits shifting from the normal power mode to level 2 of the power saving mode.

If an event that causes a shift to the power saving mode is an event based on an instruction sent from a user, a message is displayed on the touch panel on the operation unit 220 to notify the user that shifting to the power saving mode is prohibited.

The control unit 301 may control power supply in such a way as to prohibit shifting to level 2 of the power saving mode, but permit shifting to level 1 of the power saving mode. At level 1 of the power saving mode, power supply to the operation unit 220, the scanner 230, and the printer 240 is stopped. However, power is supplied to the controller unit 200, so that it is still possible to send a document storage notice as illustrated in FIG. 6.

According to the present exemplary embodiment, even if an e-mail transmission process is not executed in step S801, when the control unit 301 determines in step S802 that there is storage information of document data, the control unit 301 prohibits shifting to level 2 of the power saving mode.

In step S803, the control unit 301 makes an inquiry to the document management unit 320 and determines whether a document storage process in FIG. 4 is being executed. If the control unit 301 determines that a document storage process is in progress, the process returns to step S802, and again confirms whether there is storage information of document data. On the other hand, if the control unit 301 determines that a document storage process is not being executed (NO in step S803), the process proceeds to step S804.

In step S804, the control unit 301 sends a reply to the power saving management unit 310 stating that it permits shifting to level 2 of the power saving mode. The power saving management unit 310 stops power supply to the CPU 202, the HDD 205, the scanner 230, and the printer 240, and shifts power supply to level 2 of the power saving mode.

According to the present exemplary embodiment, if there is an e-mail to be generated and transmitted a certain period or time afterward, the MFP 110 is controlled not to shift to the power saving mode even when a process is not in progress in the MFP 110. Therefore, the MFP 110 is prevented from being shifted to the power saving mode after a document storage process is performed with the e-mail in which URI information has been written being left untransmitted. In other words, a problem can be prevented that a document storage notice is not issued for many hours.

After all the information stored in the information management unit 304 has been notified by the e-mail, since shifting to level 2 of the power saving mode is permitted, power consumption can be reduced in an appropriate manner.

If transmission of the e-mail fails, newly stored storage information of document data is saved in the information management unit 304 without being deleted. For this reason, shifting to the power saving mode can be restricted until a next document storage notice is issued. Thus, the process can be continued without shifting to the power saving mode for a period until a document storage notice can be issued in an appropriate manner.

According to the present exemplary embodiment, it is not necessary to return from the power saving mode to the normal power mode when a predetermined time comes for a document storage notice to be issued as the conventional apparatus. As a result, after a series of processing have been executed appropriately, it is possible to shift to the power saving mode. Therefore, the number of times the MFP needs to be wastefully shifted to the power saving mode and returned from the power saving mode can be reduced.

In the present exemplary embodiment, as a generation condition of an event for shifting to level 2 of the power saving mode, an event that causes shifting to the power saving mode can be allowed to occur on condition that a job is not being executed in the MFP for a predetermined length of time. In the MFP according to the present exemplary embodiment, even if intervals of a predetermined length of time (hereafter referred to as a predetermined length of time T1) set as a condition for this event generation condition are set to be shorter than a period of periodically issuing a document storage notice (hereafter referred to as T2), shifting to the power saving mode can be performed appropriately.

More specifically, if a predetermined length of time T1>a period T2, an event never occur which causes shifting to the power saving mode after a document storage process has been executed and before a document storage notice is issued. However, if a predetermined period of time T1<a period T2, an event may occur which causes shifting to the power saving mode after a document storage process has been executed and before a document storage notice is issued.

Even when an event occur which causes shifting to the power saving mode if a predetermined length of time T1>a period T2, according to the present exemplary embodiment, an advantageous effect is can be obtained that shifting to the power saving mode can be performed appropriately.

In the first exemplary embodiment, in a case where a document storage notice needs to be issued after a document storage process has been executed and a certain length of time elapses, shifting to the power saving mode is restricted. However, when a newly stored document has been deleted before a document storage notice is issued. It is not necessary to restrict shifting to the power saving mode.

In a second exemplary embodiment, in a case where it is not necessary to issue a document storage notice any more because the document has been deleted, shifting to the power saving mode is permitted. Since the configuration of the MFP 110 according to the second exemplary embodiment is similar to that of the first exemplary embodiment, its description is omitted.

Figure 9:
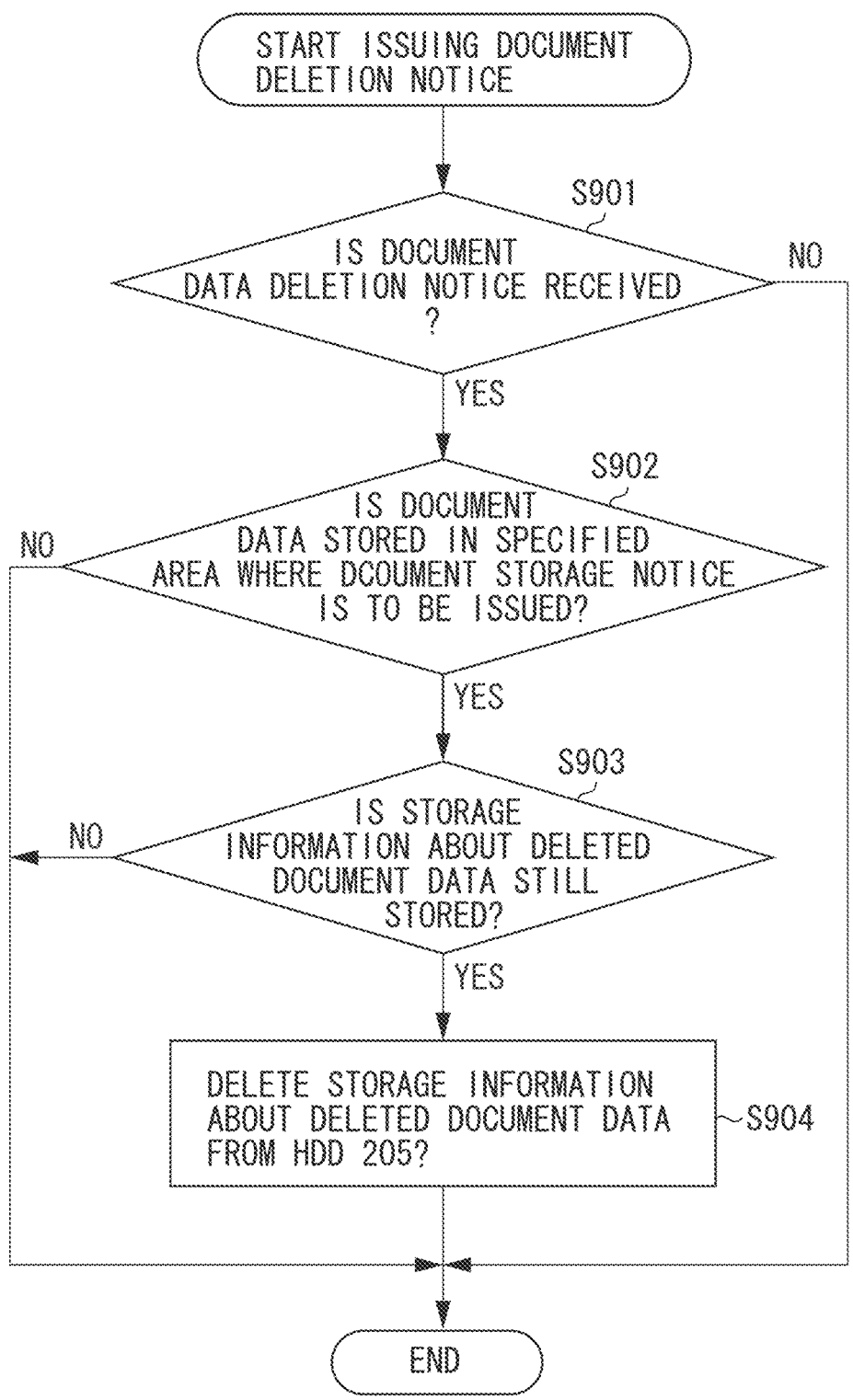
FIG. 9 is a flowchart illustrating a document deletion process according to a second exemplary embodiment.

Referring to FIG. 9, a process of deleting a document stored by the document management unit 320 in the MFP according to the second exemplary embodiment will be described. The programs that execute the steps of the flowchart in FIG. 9 are stored in the HDD 205 or the ROM 206 of the MFP 110. The programs are loaded to the RAM 203 and executed by the CPU 202.

The flowchart in FIG. 9 is started when a user issues an instruction to delete a document stored in the box.

In step S901, the information management unit 304 determines that a deletion notice of document data has been received from the document management unit 320. In step S902, the information management unit 304 confirms the location where the document data has been stored. In step S902, the information management unit 304 determines whether the location where the deleted document data was stored was in a predetermined area where a document storage notice is to be issued.

If it is determined that the document data was stored in the predetermined area (YES in step S902), the process proceeds to step S903. If it is determined that the deletion notice was stored outside of the predetermined area (NO in step S902), nothing is done and the process is finished.

In step S903, the control unit 301 determines whether deleted document data is included in the storage information stored by the information management unit 304. The control unit 301 makes an inquiry to the information management unit 304 whether storage information of the deleted document data is still stored. The information management unit 304 confirms whether the storage information of the inquired document data still remains in the storage information saved in the HDD 205.

If the document data still remains, the control unit 301 makes a request to the information management unit 304 to delete the information. The information management unit 304 deletes the storage information of the requested document data from the HDD 205, and the process is finished. If the storage information of the deleted document data is not stored, the process is finished.

In the present exemplary embodiment, when document data is deleted, storage information of the document data is also deleted. As a result, in step 601 of the flowchart in FIG. 6, the control, unit 301 determines that there is no storage information of the document data. As a result, an e-mail of a document storage notice is not transmitted. Therefore, it is possible to prevent an inconvenience that shifting to a power saving mode is impossible because of the presence of storage information which is not necessary any more.

The present invention can be realized also by executing the process described below. Software (programs) for implementing the functions of the above exemplary embodiments is supplied to a system or an apparatus via a network or various types of storage media. A computer (or a CPU or an MPU, for example) of the system or the apparatus reads and executes the programs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-211984 filed Sep. 22, 2010, which is hereby incorporated by reference herein in its entirety.

What is claimed is:

1. An image processing apparatus, comprising:
a storage device configured to store documents;
a controller configured to determine whether or not a document has been newly stored in the storage device; and
a sending unit configured to, in a case where it is determined by the controller that a document has been newly stored in the storage device, send an e-mail including information indicative of a storage location of the newly stored document;
a power supply unit configured to supply power to the controller in a first power mode; and
a detection unit configured to detect a user's instruction for shifting from a first power mode in which power is supplied to the controller to a second power mode in which power is not supplied to the controller,
wherein the controller is configured to, if the user's instruction is detected by the time that the e-mail is sent, perform control so that shifting from the first power mode to the second power mode is prohibited.

2. The image processing apparatus according to claim 1, wherein the controller is configured to perform control so that shifting to the second power mode is permitted, in response to an operation in which the sending unit has sent the e-mail.

3. The image processing apparatus according to claim 1, wherein the storage location is a universal resource identifier.

4. The image processing apparatus according to claim 1, wherein the controller performs the determination at regular intervals.

5. The image processing apparatus according to claim 1, wherein the storage device is configured to store the document according to a user's instruction.

6. The image processing apparatus according to claim 1, wherein the storage device is configured to automatically store documents received from other apparatuses.

7. A control method for an image processing apparatus, comprising:
storing documents in a storage device;
determining whether or not a document has been newly stored in the storage device using a controller; and
in a case where it is determined by the controller that a document has been newly stored in the storage device, sending an email including information indicative of a storage location of the newly stored document;
supplying power to the controller in a first power mode; and
detecting a user's instruction for shifting from a first power mode in which power is supplied to the controller to a second power mode in which power is not supplied to the controller,
wherein the controller is configured to, if the user's instruction is detected by the time that the e-mail is sent, performing control so that shifting from the first power mode to the second power mode is prohibited.

8. A non-transitory computer-readable recording medium storing a program to cause the image processing apparatus to execute the control method according to claim 7.

* * * * *